May 21, 1957     J. D. LETTER     2,792,825
STONE CUTTING MACHINE

Filed Jan. 10, 1955     3 Sheets-Sheet 1

INVENTOR
JOSEPH D. LETTER

BY
*Holcombe, Wetherill & Brusebois*
ATTORNEYS

May 21, 1957

J. D. LETTER 2,792,825

STONE CUTTING MACHINE

Filed Jan. 10, 1955

INVENTOR
JOSEPH D. LETTER

BY
Holcombe Wetherill & Brisebois
ATTORNEYS

May 21, 1957 J. D. LETTER 2,792,825
STONE CUTTING MACHINE
Filed Jan. 10, 1955 3 Sheets-Sheet 3

INVENTOR
JOSEPH D. LETTER

BY
*Holcombe Wetherill & Dubois*
ATTORNEYS

United States Patent Office 2,792,825
Patented May 21, 1957

2,792,825

STONE CUTTING MACHINE

Joseph D. Letter, Barre, Vt.

Application January 10, 1955, Serial No. 480,767

4 Claims. (Cl. 125—21)

This invention relates to a machine for cutting stone by means of an endless abrasive cutting wire or cable.

Heretofore it has been the practice in cutting stone by means of wires or cables to mount the machine so that it may be moved vertically by some mechanical means, such as a mechanical hoist which is then lowered at a constant rate. Various difficulties have been encountered with these devices due to the uncertainty of mechanical lowering means.

It is an object of this invention to provide a machine for cutting stone by means of a wire having abrasive materials supplied thereto at the point of cut, wherein all of the equipment is mounted on a horizontal carriage.

It is also an object of this invention to provide adjustable bearing means against the vertical support for the carriage so as to eliminate binding of the carriage on the support during the lowering of the carriage.

It is still another object of this invention to raise and lower the carriage by means of an oil driven hydraulic system.

A still further object of this invention is to have the hydraulic system controlled by a series of valves which will provide a rapid movement in either direction and at the same time allow an adjustable slow motion down-feed.

These and other advantages will be apparent from the following drawings and the description of the drawings attached hereto, wherein.

Figure 1:
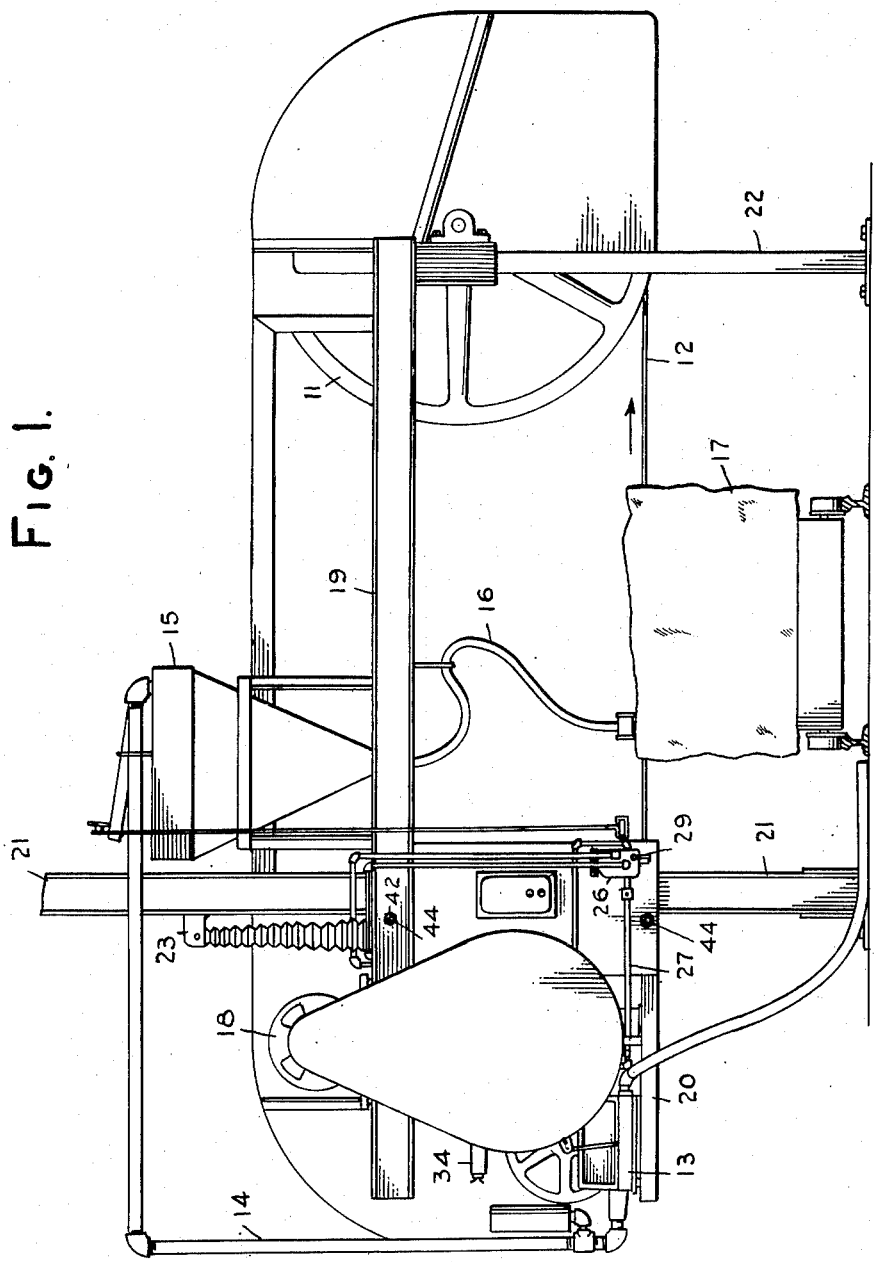
Figure 1 is a side view of the machine set up for operation.
Figure 2:
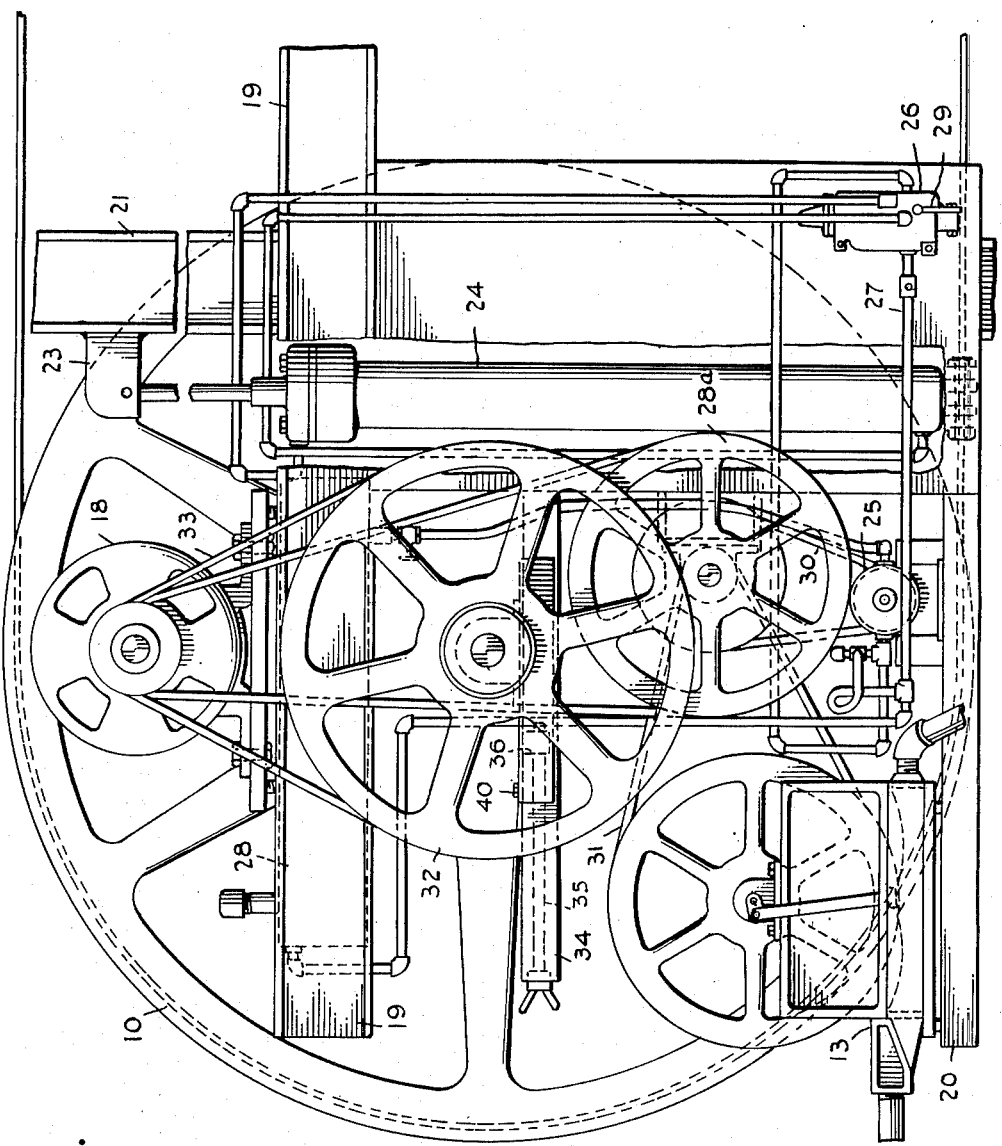
Fig. 2 is a side view with the safety shields removed to show the operating mechanism.

The wire cutting machine comprises two wheels 10 and 11, the latter being shown in Fig. 1, and having a cutting wire 12 rove through the sheaves which are rubber lined to prevent the wire from cutting the sheave. A pump 13, shown in Fig. 1, delivers the abrasive suspension through the pipe 14 to the hopper 15 where it is fed by gravity through the flexible pipe 16 to the work piece 17, at the point of entry of the cutting wire 12. The motor 18 is mounted on the upper horizontal frame 19, the lower horizontal frame 20 being connected to the upper frame by means of a welded sheet of metal (not shown). These two horizontal frames 19 and 20 form the carriage which supports all of the equipment and is movable vertically on the vertical support 21 and guide 22 by means of the hydraulic system rigidly mounted between the frames 19 and 20 and connected to the support 21 by means of the pivot block 23. This system is shown in greater detail in Fig. 2, wherein the hydraulic cylinder 24 is shown with its piston rod connected to the block 23 welded fast to the vertical support 21. The pump 25 supplies oil under pressure to the valve assembly 26 through the conduit 27 receiving the oil from the tank 28 behind the horizontal support 19, as shown in Fig. 2. The quick acting lever 29 on the valve assembly allows the rapid raising or lowering of the entire carriage. This valve assembly also has an automatic down-feed of variable rate which permits the carriage to be lowered at a predetermined rate according to the type of stone to be cut. That is, it may be set to lower fairly rapidly when cutting a soft stone, such as marble, or slowly lowered when cutting a harder stone, such as granite.

Figure 8:
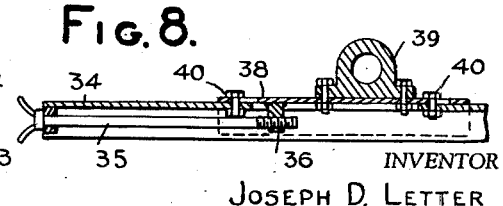
Fig. 8 is a view in section of the wire tensioning device.

The motor 18 drives the pulley 28a by means of a belt shown in Fig. 1. This pulley drives the pump 25 by means of the belt 30 and the pump 13 by means of the belt 31, which pump 13, is of the rubber diaphragm type used to pump abrasive suspensions. The motor 18 also drives the pulley 32 by means of the belt 33 which drives the larger wheel 10 having the wire rove onto its outer surface and forces this wire through the work piece 17, shown in Fig. 1. The wire tension control and take up is maintained by means of the device 34, shown in Figure 2, and in greater detail in Figure 8, wherein a threaded rod 35 is fed through a threaded nut 36 rigidly attached to the slide 38 having mounted thereon the bearing 39 containing the shaft driven by the pulley 32 and drives the wheel 10. This slide has two lock bolts 40, 40 on each side thereof. The threaded rod 35 may rotate to move the wheel 10 so as to produce the proper tension on the wire 12.

Figure 4:
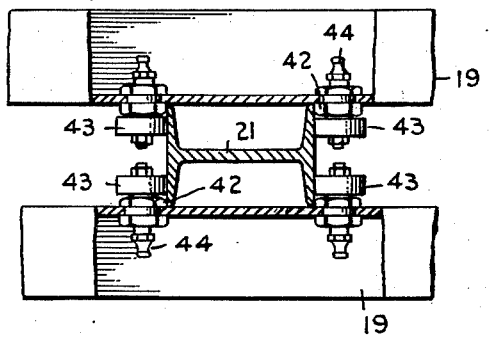
Fig. 4 is a top view in section of the cam bearing.
Figure 3:
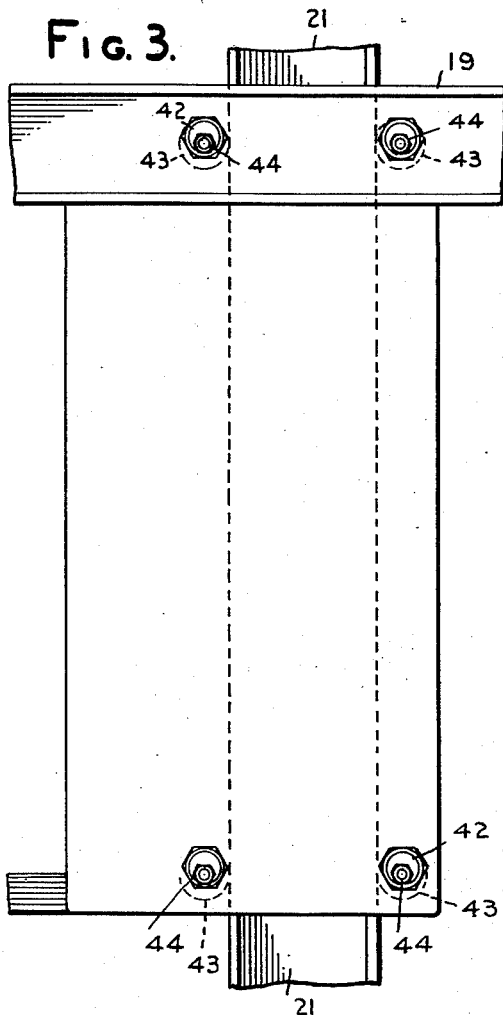
Fig. 3 is a detailed side view of the cam bearing.
Figure 5:
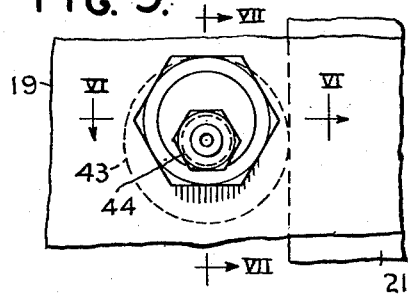
Fig. 5 is an enlarged side view of the cam bearing.
Figure 7:
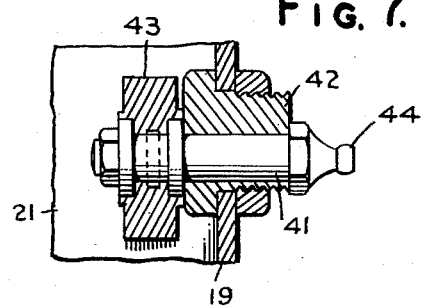
Fig. 7 is a section taken on line VII—VII of Fig. 5.

The machine as a whole is supported by a single upright 21 and balanced by having approximately equal turning forces on each side of this support. The carriage bears against the upright 22 in the usual manner and it also bears against both sides of the upright support 21 by adjustable roller bearings shown in Fig. 3, wherein the shaft 41 shown in Fig. 7 goes through the bearing 42 and has the follower 43 mounted thereon. These followers 43, 43 shown in Fig. 4, bear against the upright 21 and are adjustable by means of the off-center hexagonal headed bearings 42 producing a cam motion on rotation of the bearing 42.

Figure 6:
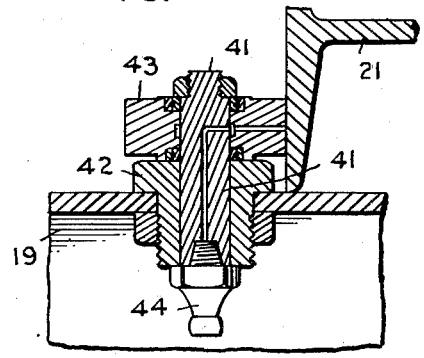
Fig. 6 is a section taken on line VI—VI of Fig. 5.

The grease fitting 44, shown in Fig. 6, allows the lubricant to enter the passageway down the shaft 41 and lubricates the roller bearings between the shaft and the follower 43 and at the same time lubricates the follower in its contact with the upright support 21. This allows the adjustment of all four of the bearings shown in Fig. 3, so that the tendency of the carriage to bind may be compensated for by the adjustment of the hexagonal headed cam bearings 42, which in turn control the follower 43.

In operation the work piece 17 on any convenient type carriage is placed under the wire 12, the machine being raised by means of the quick acting valve, controlled by the lever 29. It is then lowered by means of this same lever until the wire rests on the work piece. The automatic variable rate down-feed is then adjusted and placed in operation. The pump 13 supplies the abrasives to the hopper 15, which then feeds it on to the work at the point of contact of the wire with the work piece. The machine is lowered automatically by means of the valve systems allowing a constant rate of cut and producing an automatic device.

This has many advantages over any device heretofore used. The oil operated hydraulic system is free from trouble caused by temperature changes and the valve system produces the most perfect automatically controlled constant rate lowering device that can be produced. All of the pumps are supplied by power from a single source, that is, a single motor, and all of the equipment is mounted on the carriage and is raised and lowered with the carriage. The control system in addition to giving an automatic down-feed has a rapid lift and lowering by-pass to produce a readily controlled machine.

Many variations of the invention illustrated by the description and the drawings will be apparent to one skilled in the art and this invention is only limited by the claims attached hereto, wherein I claim:

1. A stone sawing machine comprising in combination, one upright support, an elongated carriage vertically movable thereon, said carriage having mounted thereon two wheels for driving a wire in cutting engagement with a work piece, a wire roved about said wheels, a pump to supply abrasive material to the cutting wire on the work piece, a second pump to supply oil under pressure to a hydraulic system, a single motor supplying power for operating said pumps and said wire driving wheels, a hydraulic cylinder rigidly mounted on said frame and connected to the upright support by means of a piston, and valve means to control the height of the carriage.

2. A stone sawing machine comprising in combination, one upright support, an elongated carriage vertically movable thereon, said carriage having mounted thereon two wheels for driving a wire in cutting engagement with a work piece, a wire roved about said wheels, a pump to supply abrasive material to the cutting wire on the work piece, a second pump to supply oil under pressure to a hydraulic system, a single motor supplying power for operating said pumps and said wire driving wheels, a hydraulic cylinder rigidly mounted on said frame and connected to the upright support by means of a piston, valve means to control the height of the carriage and to provide an automatic down feed of variable rate.

3. A stone sawing machine comprising in combination, one upright support, an elongated carriage vertically movable thereon, horizontally contacting said support by means of adjustable bearings, said carriage having mounted thereon two wheels for driving a wire in cutting engagement with a work piece, a wire roved about said wheels, a pump to supply abrasive material to the cutting wire on the work piece, a second pump to supply oil under pressure to a hydraulic system, a single motor supplying power for operating the pumps and wire driving wheels, a hydraulic cylinder rigidly mounted on said frame and connected to the upright support by means of a piston so as to control the height of the horizontal frame.

4. A stone sawing machine comprising in combination, one upright support, an approximately balanced elongated carriage vertically movable thereon, horizontally contacting said support by means of cam adjustable bearings, said carriage having mounted thereon two wheels for driving a wire in cutting engagement with a work piece, a wire roved about said wheels, a pump to supply abrasive material to the cutting wire on the work piece, a second pump to supply oil under pressure to a hydraulic system, a single motor supplying power for operating the pumps and wire driving wheels, a hydraulic cylinder rigidly mounted on said frame and connected to the upright support by means of a piston so as to control the height of the horizontal frame.

References Cited in the file of this patent

UNITED STATES PATENTS

| | | |
|---|---|---|
| 315,171 | Saunders | Apr. 7, 1885 |
| 377,595 | Barney et al. | Feb. 7, 1888 |
| 451,199 | Kesseler | Apr. 28, 1891 |
| 2,165,335 | Brock | July 11, 1939 |
| 2,212,656 | Brock | Aug. 27, 1940 |
| 2,674,238 | Dessureau et al. | Apr. 6, 1954 |

FOREIGN PATENTS

| | | |
|---|---|---|
| 1,168 | Sweden | Mar. 22, 1886 |
| 25,259 | Great Britain | Nov. 10, 1896 |
| 312,582 | France | Mar. 4, 1903 |
| 409,956 | France | May 7, 1910 |